Jan. 15, 1924.
H. CASON
1,481,049
TRAILER
Filed Nov. 2, 1922
2 Sheets-Sheet 2
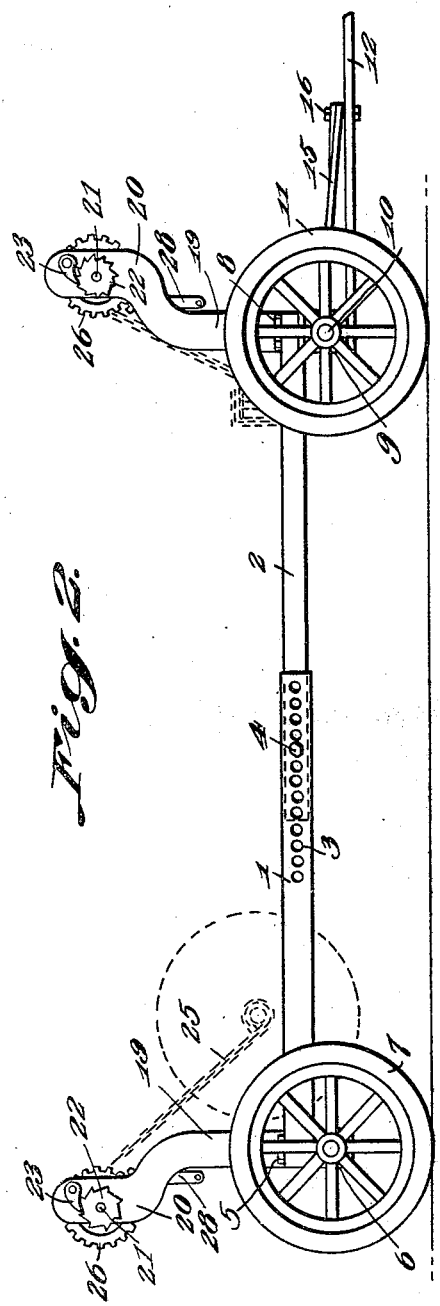
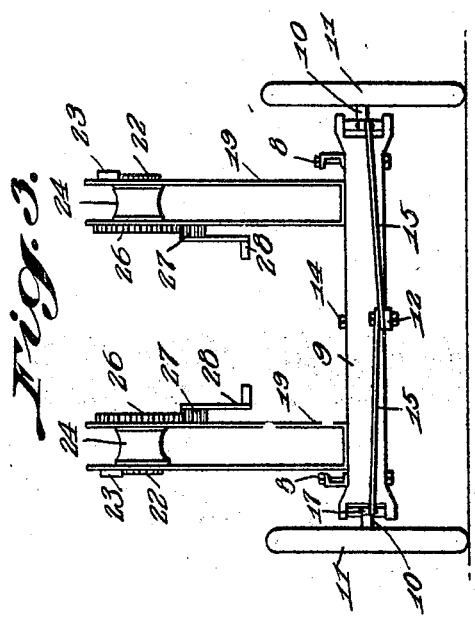
Inventor
H. Cason
By C. A. Snow & Co.
Attorneys Patented Jan. 15, 1924.

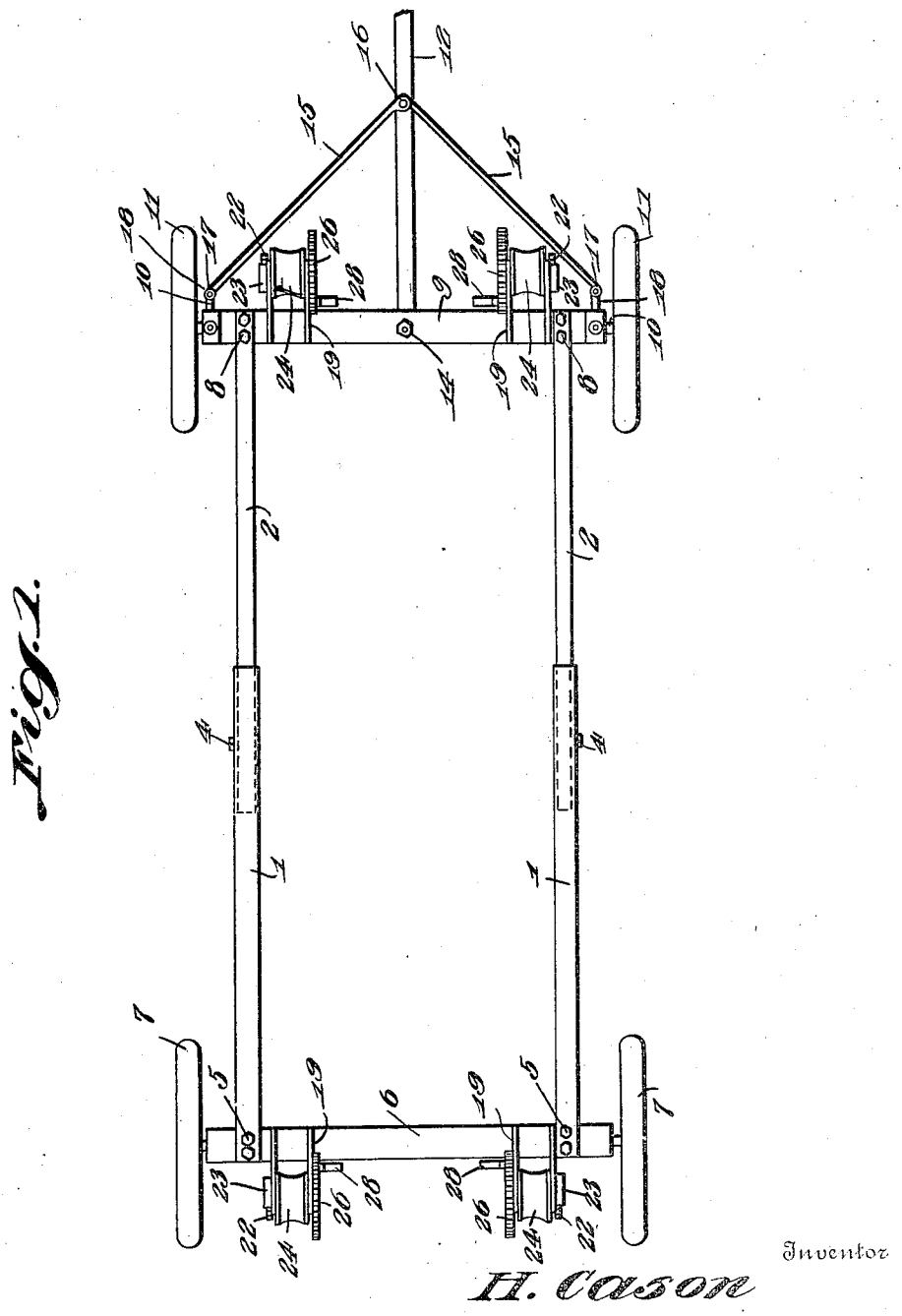

1,481,049

UNITED STATES PATENT OFFICE.

HENRY CASON, OF ST. LOUIS, MISSOURI.

TRAILER.

Application filed November 2, 1922. Serial No. 598,570.

*To all whom it may concern:*

Be it known that I, HENRY CASON, a citizen of the United States, residing at St. Louis, in the city of St. Louis and State of Missouri, have invented a new and useful Trailer, of which the following is a specification.

This invention aims to provide a simple means whereby a disabled motor propelled vehicle may be lifted off the ground and transported readily, even though both front and rear wheels of the vehicle may be broken.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown may be made without departing from the spirit of the invention.

In the accompanying drawings:—

Figure 1 shows in front plan, a device constructed in accordance with the invention, the chains being omitted; Figure 2 is a side elevation; Figure 3 is a front elevation.

The frame of the machine forming the subject matter of this application includes rear bars 1, which may be channels, front bars 2, which may be channels, likewise being telescoped into the rear bars 1 for longitudinal adjustment, the overlapped ends of the bars 1 and 2 being supplied with openings 3, any of which, being brought into alinement, are adapted to receive securing elements 4, such as bolts, to the end that the length of the frame may be adjusted. The rear ends of the bars 1 are secured at 5 to a rear axle 6 whereon rear wheels 7 are journaled. The forward ends of the front bars 1 are secured at 8 to a forward axle 9 which may be provided with movable ends 10 having forwardly presented arms 18. Forward wheels 11 are journaled on the ends 10. Any suitable means may be provided for drawing or towing the vehicle. If preferred, the rear end of a tongue 12 may be pivoted at 14 to the forward axle 9, links 15 being pivoted at their forward ends, as at 16, to the tongue 12, the rear ends of the links being pivoted at 17 to the forwardly presented arms 18 of the movable axle ends 10.

U-shaped standards 19 are erected on the rear axle 6 and on the forward axle 9, the forward standards being offset forwardly, and the rear standards being offset rearwardly, at their upper ends, as shown at 20, so as to provide ample space between the standards at the front end of the vehicle and the standards at the rear end of the vehicle, to receive the operating mechanism hereinafter described. Shafts 21 are journaled in the offset ends 20 of the standards 19. Ratchet wheels 22 are secured to the shafts 21 and are located on the outer sides of the standards 19. Pawls 23 cooperate with the ratchet wheels 22 and are mounted pivotally on the upper ends of the standards 19. Drums 24 are secured to the shafts 21 and are located between the constituent members of the standards 19. Flexible elements 25 are trained about the drums 24. Gear wheels 26 are secured to the inner ends of the shafts 21. Pinions 27 mesh with the gear wheels 26 and are journaled on the standards 19, the pinions 27 having cranks 28.

In practical operation, the constituent parts 1 and 2 of the frame work of the machine are separated by removing the securing elements 4 and the parts of the vehicle are placed, by moving them endwise, about the disabled automobile. The bars 1 and 2 then are adjusted with respect to each other, longitudinally, so that the frame may have the desired length, whereupon the securing elements 4 are mounted in place, so as to unite the bars 1 with the bars 2. The flexible elements or chains 25 are engaged around the front and rear axles of the disabled automobile, as indicated diagrammatically in Figure 2. Rotation may be imparted to the pinions 27, by way of the cranks 28, the pinions rotating the shafts 21 through the instrumentality of the gear wheels 26. Then the shafts 21 are rotated, the drums 24 will be rotated and the chains 25 will be reeled on the drums, the disabled automobile thus being elevated and being held elevated, for transportation to a place of repair. The pawls 23, coacting with the ratchet wheels 22, prevent a reverse rotation of the shafts 21, and, thus the automobile which is being carried will be held in any position to which it may have been elevated.

Having thus described the invention, what is claimed is:

In a device of the class described, a wheel-mounted vehicle comprising front and rear axles, side beams connected at their outer ends to the axles, means for uniting the inner ends of the side beams detachably, pairs of drums, the drums of one pair being located at a higher elevation than the side beams, in front of the front axle and closely adjacent to the side beams, the drums of the other pair being located at a higher elevation than the side beams, to the rear of the rear axle and closely adjacent to the side beams, and means on the axles for supporting the drums for rotation in the locations specified.

In testimony that I claim the foregoing as my own, I have hereto affixed my signature in the presence of two witnesses.

HENRY CASON.

Witnesses:
 JOSEPHINE PRALL,
 ROMAN S. NAWAK.